(12) United States Patent
Domingo

(10) Patent No.: US 9,372,522 B2
(45) Date of Patent: Jun. 21, 2016

(54) OVERVOLTAGE PROTECTION SYSTEMS AND METHOD

(75) Inventor: Reynaldo P Domingo, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 147 days.

(21) Appl. No.: 14/376,134

(22) PCT Filed: Apr. 20, 2012

(86) PCT No.: PCT/US2012/034505
§ 371 (c)(1),
(2), (4) Date: Jul. 31, 2014

(87) PCT Pub. No.: WO2013/158117
PCT Pub. Date: Oct. 24, 2013

(65) Prior Publication Data
US 2015/0043256 A1 Feb. 12, 2015

(51) Int. Cl.
*H02H 7/125* (2006.01)
*G06F 1/30* (2006.01)
*H02H 3/20* (2006.01)
(Continued)

(52) U.S. Cl.
CPC ............... *G06F 1/30* (2013.01); *H02H 3/202* (2013.01); *H02H 7/1227* (2013.01); *H02H 7/1252* (2013.01); *H02M 7/44* (2013.01)

(58) Field of Classification Search
CPC ....... H02H 7/10; H02H 7/125; H02H 7/1252; H02M 2001/0006; H02M 1/36
USPC ............ 363/49, 50, 51, 52, 53, 125; 323/266, 323/901
See application file for complete search history.

(56) References Cited

U.S. PATENT DOCUMENTS

| | | | | |
|---|---|---|---|---|
| 4,910,654 A | * | 3/1990 | Forge | H02H 9/001 323/908 |
| 5,402,331 A | * | 3/1995 | Takahashi | H02M 1/425 323/225 |
| 6,987,378 B1 | | 1/2006 | Steele | |

(Continued)

FOREIGN PATENT DOCUMENTS

| CN | 1388618 A | 1/2003 |
|---|---|---|
| CN | 1767338 A | 5/2006 |

(Continued)

OTHER PUBLICATIONS

International Preliminary Report on Patentability received in PCT Application No. PCT/US2012/034505, Oct. 30, 2014, 6 pages.

(Continued)

*Primary Examiner* — Gary L Laxton
(74) *Attorney, Agent, or Firm* — Tarolli, Sundheim, Covell & Tummino, L.L.P.

(57) ABSTRACT

A power supply system and method are disclosed. The system includes a power supply to generate an output voltage in response to a pulse-width modulation (PWM) signal and a DC main voltage. The system also includes an AC/DC converter to generate the DC main voltage based on an AC input voltage. The system further includes a power supply controller to generate the PWM signal based on feedback associated with the output voltage. The power supply controller includes a fault controller to detect an overvoltage condition associated with the power supply and to cause the AC/DC converter to disable the DC main voltage in response to the overvoltage condition.

15 Claims, 3 Drawing Sheets

(51) Int. Cl.
*H02H 7/122* (2006.01)
*H02M 7/44* (2006.01)

(56) References Cited

U.S. PATENT DOCUMENTS

| | | | |
|---|---|---|---|
| 7,518,430 | B2 | 4/2009 | Dequina et al. |
| 7,586,267 | B2 | 9/2009 | Po |
| 7,639,466 | B2 | 12/2009 | Wang |
| 7,719,810 | B2 | 5/2010 | Ueda |
| 7,787,222 | B2 | 8/2010 | Covi et al. |
| 8,730,689 | B2 * | 5/2014 | De Haan ............... H02M 7/062 323/231 |
| 9,041,245 | B2 * | 5/2015 | Yoon ................... H02H 3/20 307/11 |
| 9,166,493 | B2 * | 10/2015 | Sekimoto ............. H02M 5/458 |
| 2008/0012542 | A1 * | 1/2008 | Liu ....................... H02M 1/32 323/271 |
| 2010/0013450 | A1 | 1/2010 | Huang et al. |
| 2011/0110007 | A1 | 5/2011 | Ting |
| 2011/0227548 | A1 | 9/2011 | Tsai |
| 2011/0228435 | A1 | 9/2011 | Yeh |
| 2012/0049761 | A1 | 3/2012 | Yu et al. |

FOREIGN PATENT DOCUMENTS

| | | |
|---|---|---|
| CN | 101127483 A | 2/2008 |
| CN | 102255493 A | 11/2011 |
| CN | 102332819 A | 1/2012 |

OTHER PUBLICATIONS

International Search Report & Written Opinion received in PCT Application No. PCT/US2012/034505, Dec. 26, 2012, 9 pages.

* cited by examiner

OVERVOLTAGE PROTECTION SYSTEMS AND METHOD

BACKGROUND

A variety of computer systems implement DC voltage to provide power to processors and/or memory. To provide the power, computer systems typically implement a distributed power system to provide the DC power to a set of processors and/or memory systems. Upon a distributed DC main power in a computer system that is applied at the input of a multi-power trains high current central processing unit (CPU) or memory voltage regulator, a short circuit in the associated power supply, such as at a high-side switch, can couple an input source directly to an output load. This can cause an output overvoltage condition that, if not clamped, can damage the respective load. Upon the overvoltage condition being detected, such as via external overvoltage detection circuitry, the distributed DC main power can be disabled to substantially protect the load.

DETAILED DESCRIPTION

Figure 1:
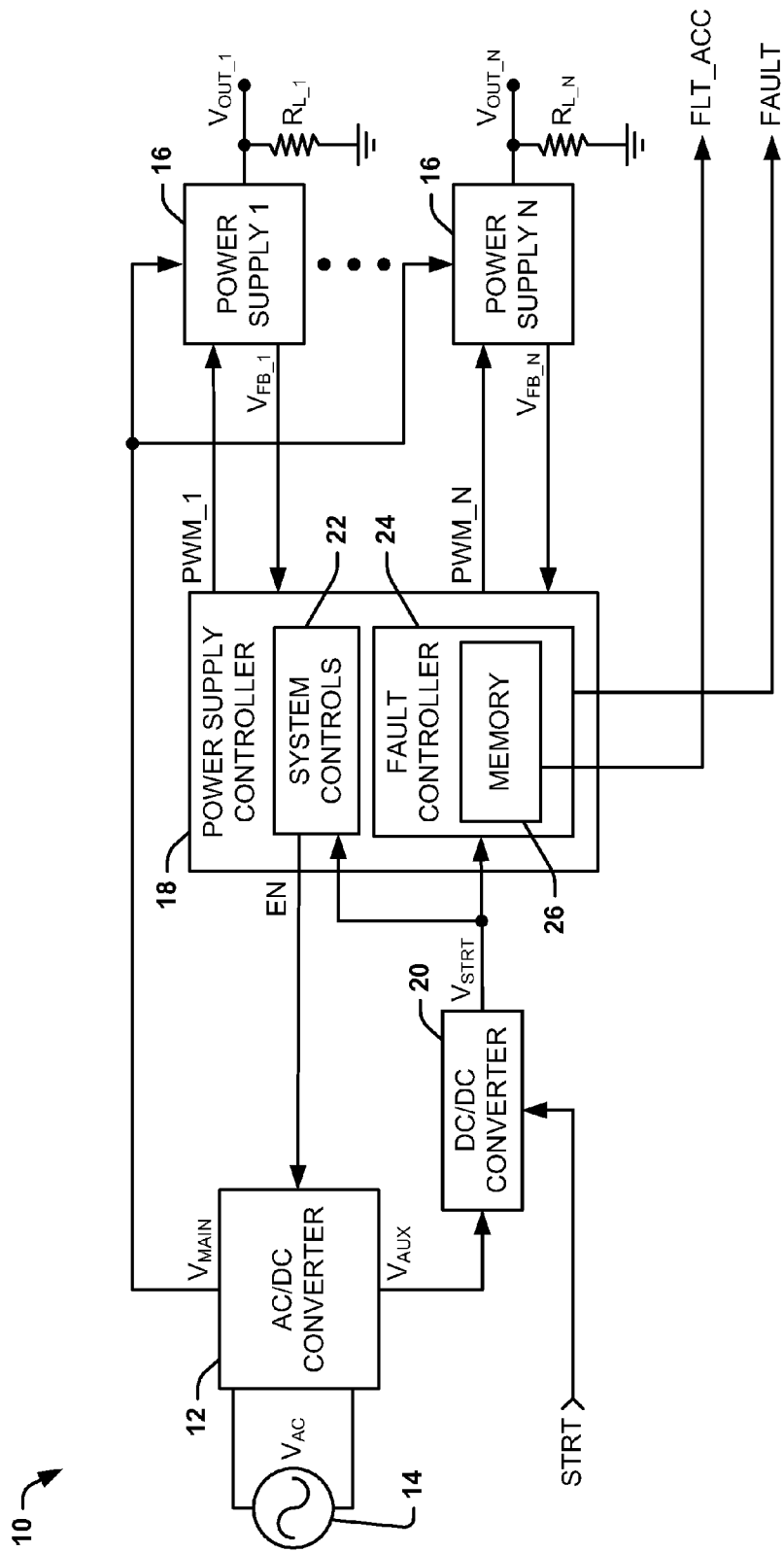
FIG. 1 illustrates an example of a power supply system.

FIG. 1 illustrates an example of a power supply system 10. As an example, the power supply system 10 can be implemented in a variety of computer systems and/or portable electronic devices, such as laptop or tablet computers or in wireless communication devices. The power supply system 10 includes an AC/DC converter 12 that is configured to generate a DC main voltage $V_{MAIN}$ (e.g., 12 volts) based on an AC voltage $V_{AC}$. In the example of FIG. 1, the AC voltage $V_{AC}$ is generated via an AC power supply 14. The DC main voltage $V_{MAIN}$ is provided to each of a plurality N of power supplies 16, where N is a positive integer. The power supply system 10 also includes a power supply controller 18 that is configured to control the plurality of power supplies 16. The power supply controller 18 is also configured to provide overvoltage protection for overvoltage conditions associated with the power supply system 10, as described in greater detail herein.

In the example of FIG. 1, each of the plurality of power supplies 16 is configured to generate a respective output voltage $V_{OUT\_1}$ through $V_{OUT\_N}$ that provides power to a respective load $R_{L\_1}$ through $R_{L\_N}$. As an example, the loads $R_{L\_1}$ through $R_{L\_N}$ can be configured as memory systems, processors, or a combination of memory systems and processors. The power supply controller 18 is configured to generate respective pulse-width modulation (PWM) signals PWM_1 through PWM_N, such that the power supplies 16 are configured to generate the respective output voltages $V_{OUT\_1}$ through $V_{OUT\_N}$ based on the signals PWM_1 through PWM_N and the DC main voltage $V_{MAIN}$.

For example, each of the power supplies 16 can include a high-side switch and a low-side switch that are alternately activated based on the signals PWM_1 through PWM_N to conduct current through an inductor to generate the respective output voltages $V_{OUT\_1}$ through $V_{OUT\_N}$. As an example, the power supply controller 18 can be configured to generate the signals PWM_1 through PWM_N based on feedback associated with the respective output voltages $V_{OUT\_1}$ through $V_{OUT\_N}$, demonstrated in the example of FIG. 1 as feedback voltage $V_{FB\_1}$ through $V_{FB\_N}$. While it is demonstrated in the example of FIG. 1 that the power supply system 10 includes a plurality of power supplies 16, it is to be understood and appreciated that the power supply system 10 could instead include only a single power supply 16. In addition, it is to be understood that the plurality of power supplies 16 are not limited to generating respective output voltages $V_{OUT\_1}$ through $V_{OUT\_N}$, but could instead be configured as redundant power supplies 16 configured to generate a single output voltage $V_{OUT}$.

Figure 2:
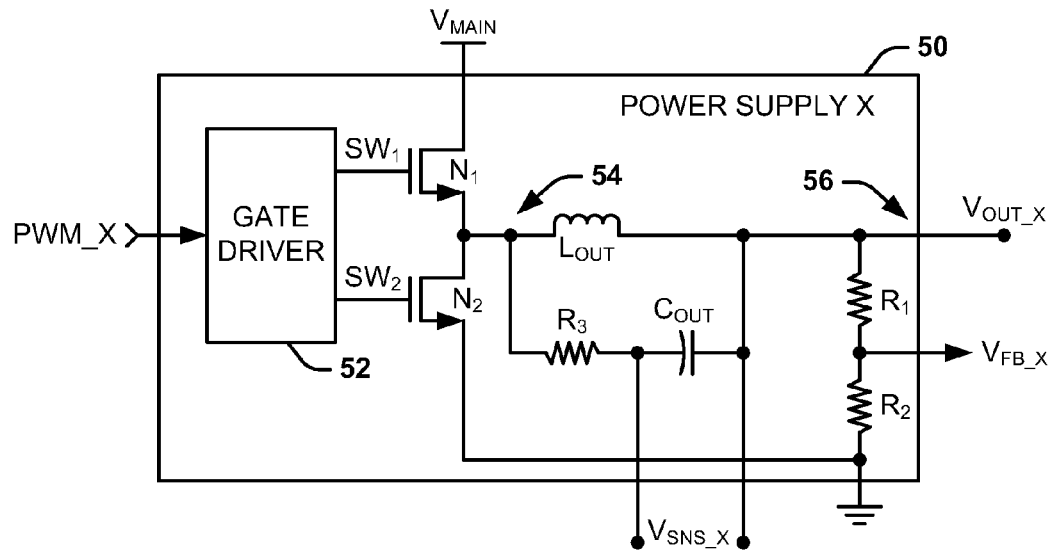
FIG. 2. illustrates an example of a power supply.

FIG. 2 illustrates an example of a power supply 50. The power supply 50 can correspond to a given one of the power supplies 16 in the example of FIG. 1, denoted as power supply "X" (i.e., the Xth of the N power supplies 16). Therefore, reference is to be made to the example of FIG. 1 in the following description of the example of FIG. 2.

The power supply 50 includes a gate driver 52. The gate driver 52 is configured to generate switching signals $SW_1$ and $SW_2$ in response to the signal PWM_X, such as provided from the power supply controller 18 in the example of FIG. 1. The switching signals $SW_1$ and $SW_2$ are provided to a high-side switch and a low-side switch, respectively, demonstrated in the example of FIG. 2 as transistors $N_1$ and $N_2$. The transistor $N_1$ interconnects the DC main voltage $V_{MAIN}$ and a switching node 54 and the transistor $N_2$ interconnects the switching node 54 with a low voltage rail, demonstrated in the example of FIG. 2 as ground. The power supply 50 also includes an inductor $L_{OUT}$ that interconnects the switching node 54 and an output 56 on which the output voltage $V_{OUT\_X}$ is provided. Therefore, the power supply 50 in the example of FIG. 2 is configured as a buck-converter that generates the output voltage $V_{OUT\_X}$ based on alternate switching of the transistors $N_1$ and $N_2$, as provided by the signal PWM_X to generate current through the inductor $L_{OUT}$.

As an example, the output voltage $V_{OUT\_X}$ can be an output voltage corresponding to a given one of the power supplies 16 in the example of FIG. 1. As another example, the output voltage $V_{OUT\_X}$ could correspond to a single output voltage $V_{OUT}$, such as based on the power supplies 16 of the power supply system 10 in the example of FIG. 1 being configured redundantly, such that the output node 56 is coupled to the output node associated with all of power supplies 16. In addition, the power supply 50 includes a pair of feedback resistors $R_1$ and $R_2$ interconnecting the output node 56 and the low voltage rail, and which are configured to generate the feedback voltage $V_{FB\_X}$. The feedback voltage $V_{FB\_X}$ thus has a magnitude that is proportional to the output voltage $V_{OUT\_X}$. The feedback voltage $V_{FB\_X}$ can thus be provided to the power supply controller 16 in the example of FIG. 1. Therefore, the feedback voltage $V_{FB\_X}$ can be implemented to generate the signal PWM_X for maintaining the magnitude of the output voltage $V_{OUT\_X}$. In the example of FIG. 2, the power supply 50 includes a resistor $R_3$ and a capacitor $C_{OUT}$ that are coupled in series with each other and in parallel with the output inductor $L_{OUT}$. The power supply controller 18 could thus be alternatively or additionally configured to monitor a magnitude of a current flow through the power supply 16 via a voltage $V_{SNS\_X}$ across the output capacitor $C_{OUT}$, such as for generating the signal PWM_X.

Referring back to the example of FIG. 1, the power supply system 10 includes a DC/DC converter 20 that is configured to generate a startup voltage $V_{STRT}$. Upon initialization of the power supply system 10, the power supply system 10 can be configured to conduct a startup procedure. During the startup procedure, the AC/DC converter 12 can be configured to initially generate an auxiliary voltage $V_{AUX}$. As an example, the auxiliary voltage $V_{AUX}$ can be generated substantially continuously by the AC/DC converter 12, and can provide power to a number of systems in an associated electronic system that includes the power supply system 10. The DC/DC converter 20 can thus generate the startup voltage $V_{STRT}$ based on the auxiliary voltage $V_{AUX}$. As an example, the startup voltage $V_{STRT}$ can be initialized based on a start signal STRT, which can be implemented to control a slew-rate of the startup voltage $V_{STRT}$. The startup voltage $V_{STRT}$ is thus provided to system controls 22 of the power supply controller 18 to provide power to the system controls 22 during the startup procedure and thereafter. As an example, the system controls 22 can correspond to an intelligent control system of the power supply controller 18. While power to the system controls 22 is demonstrated in the example of FIG. 1 as being provided via the startup voltage $V_{STRT}$, it is to be understood that the system controls 22 could instead be powered by a separate voltage, such as one that is not associated with the AC/DC converter 12.

Figure 3:
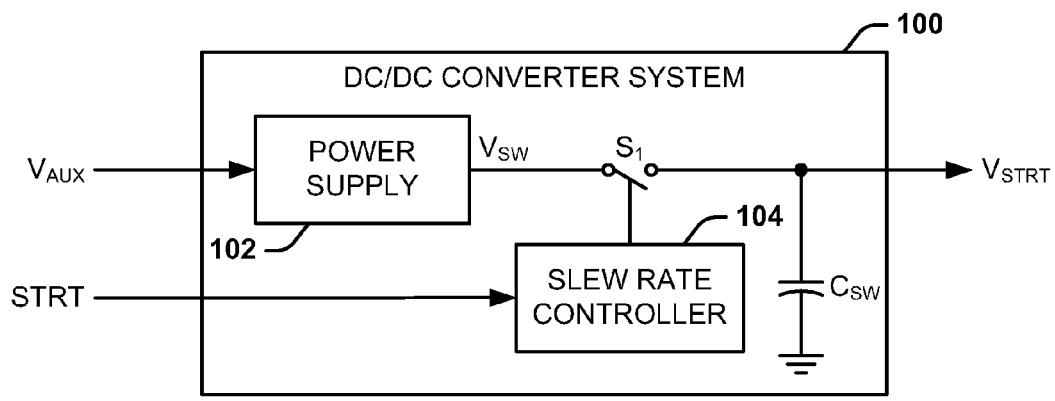
FIG. 3 illustrates an example of a DC/DC converter system.

FIG. 3 illustrates an example of a DC/DC converter system 100. The DC/DC converter system 100 can correspond to the DC/DC converter 20 in the example of FIG. 1. Therefore, reference is to be made to the example of FIG. 1 in the following description of the example of FIG. 3.

The DC/DC converter system 100 includes a power supply 102. The power supply 102 can be arranged as a buck DC/DC switching converter that is configured to generate a switch voltage $V_{SW}$ based on the auxiliary voltage $V_{AUX}$. For example, the power supply 102 can be configured to step down the auxiliary voltage $V_{AUX}$ from approximately 12 volts to a lesser magnitude of the switch voltage $V_{SW}$, such as 3.3 volts. The DC/DC converter system 100 also includes a slew-rate controller 104 that is configured to control a switch $S_1$ to control a rate of increase of the switch voltage $V_{SW}$ based on the start signal STRT. For example, the slew-rate controller 104 is configured to gate the switch voltage $V_{SW}$ via the switch $S_1$ to generate the startup voltage $V_{STRT}$ across a capacitor $C_{SW}$. Therefore, the DC/DC converter system 100 can be configured to substantially mitigate inrush current to the power supply controller 18 in the example of FIG. 1.

In addition, the switch $S_1$ can also be implemented by the power supply system 10 to disconnect the startup voltage $V_{STRT}$ from the system controls 22 of the power supply controller 18 to substantially mitigate quiescent power loss associated with the system controls 22. For example, when the power supply system 10 is in a standby mode, the power supply system 10 can open the switch $S_1$ (e.g., via the slew-rate 104) to decouple the startup voltage $V_{STRT}$ from the system controls 22. Therefore, quiescent power loss can be substantially mitigated during the standby mode.

Referring back to the example of FIG. 1, upon the system controls 22 being provided sufficient power via the startup voltage $V_{STRT}$ and being initialized to be ready for operation, the system controls 22 provides an enable signal EN to the AC/DC converter 12. In response, the AC/DC converter 12 begins generating the DC main voltage $V_{MAIN}$. As a result, the DC main voltage $V_{MAIN}$ is provided to each of the power supplies 16. In addition to the DC main voltage $V_{MAIN}$ being provided as the input voltage to the power supplies 16 via the high-side switches (e.g., the high-side switch $N_1$), the DC main voltage $V_{MAIN}$ can also provide power to the gate drivers of the respective power supplies 16 (e.g., the gate driver 52), such as based on the DC main voltage $V_{MAIN}$ being stepped down to a voltage of a lesser magnitude (not shown). Therefore, after being enabled via the signal EN, power supply system 10 can enter a ramp-up phase during which the DC main voltage $V_{MAIN}$ begins to increase from zero magnitude to full magnitude prior to the gate drivers of the respective power supply systems 16 having sufficient power to begin activating the respective high- and low-side switches. Accordingly, after ramp-up phase, the DC main voltage $V_{MAIN}$ is at the substantially maximum magnitude and the gate drivers have sufficient power for activating the high- and low-side switches, such that each of the power supplies 16 can begin to generate the respective output voltages $V_{OUT\_1}$ through $V_{OUT\_N}$.

As an example, a short-circuit in one of the power supplies 16, such as across a respective high-side switch, such as the high-side switch $N_1$ in the example of FIG. 2, can result in an overvoltage condition. For example, the short-circuit across the high-side switch $N_1$ can couple the DC main voltage $V_{MAIN}$ directly to the output 56 of the power supply 50 via the inductor $L_{OUT}$. As a result, the magnitude of the output voltage $V_{OUT\_X}$ can increase to a magnitude that is greater than an acceptable magnitude. As a result, the respective load $R_{L\_X}$, such as a processor or memory system, can be damaged by the overvoltage condition.

To detect and substantially mitigate the effects of overvoltage conditions, the power supply controller 18 includes a fault controller 24 configured to detect an overvoltage condition associated with one of the power supplies 16. As an example, the fault controller 24 can be configured to monitor a magnitude of the feedback voltages $V_{FB\_1}$ through $V_{FB\_N}$ to determine if one of the respective power supplies 16 experiences an overvoltage condition. For example, the fault controller 24 can include a comparator (not shown) configured to compare the respective feedback voltages $V_{FB\_1}$ through $V_{FB\_N}$ with a reference voltage (not shown) corresponding an acceptable magnitude for the respective output voltages $V_{OUT\_1}$ through $V_{OUT\_N}$. The detection of the overvoltage condition can occur during the ramp-up phase of the power supply system 10, such as based on the respective output voltage $V_{OUT\_X}$, and thus the respective feedback voltage $V_{FB\_X}$, increasing as the DC main voltage $V_{MAIN}$ increases prior to the high- and low side switches being activated. While it has been described that the fault controller 24 monitors the feedback voltages $V_{FB\_1}$ through $V_{FB\_N}$ to determine respective overvoltage conditions, it is to be understood that the fault controller 24 can implement other feedback information to determine the presence of an overvoltage condition, such as the sense voltage $V_{SNS\_X}$ in the example of FIG. 2 or even the magnitudes of the output voltages $V_{OUT\_1}$ through $V_{OUT\_N}$ themselves.

In response to detecting the overvoltage condition, the fault controller 24 is configured to signal the system controls 22 to deactivate the enable signal EN. As a result, the AC/DC converter 12 ceases generation of the DC main voltage $V_{MAIN}$, such that the DC main voltage $V_{MAIN}$ decreases to substantially zero magnitude. Therefore, the respective output voltage $V_{OUT\_X}$ of the respective power supply 16 that includes the short-circuit likewise decreases. Accordingly, the respective load $R_{L\_X}$ does not experience an overvoltage that can cause damage to the respective component corresponding to the load $R_{L\_X}$ (e.g., processor or memory system). In addition, in the example of FIG. 1, the fault controller 24 includes a memory 26. As an example, the memory 26 can include fault registers that are configured to store fault information associated with the overvoltage condition upon occurrence. For example, the memory 26 can store information associated with which of the power supplies 16 caused the overvoltage condition fault (and thus has the short-circuit across the high-side switch), as well as any of a variety of other data pertinent to the overvoltage condition. Accordingly, upon the occurrence of the overvoltage condition, the fault controller 24 can write the data associated with the overvoltage condition into the memory 26, and can indicate the fault to a variety of external systems (e.g., a processor or display system), demonstrated via the signal FAULT.

In the example of FIG. 1, the fault controller 24 is demonstrated as receiving power via the startup voltage $V_{STRT}$. Therefore, upon the enable signal EN being deactivated to cause the AC/DC converter 12 to disable the DC main voltage $V_{MAIN}$, the fault controller 24 can continue to be provided power based on the auxiliary voltage $V_{AUX}$, and thus the startup voltage $V_{STRT}$, continuing to be provided absent the DC main voltage $V_{MAIN}$. Therefore, subsequent to the disabling of the DC main voltage $V_{MAIN}$, the memory 26 can be accessed for telemetry, indicated by a signal FLT_ACC. Therefore, the cause of the overvoltage condition can be troubleshooted based on accessing the data within the memory 26 while the power supply system 10 remains faulted. In other words, because the power to the fault controller 24, and thus the memory 26, is not based on the DC main voltage $V_{MAIN}$, the fault controller 24 can provide the information necessary to solve the underlying problem that caused the overvoltage condition while the power supply system 10 is faulted but still receiving sufficient power. Furthermore, upon the data associated with the overvoltage condition being accessed from the memory 26, the startup voltage $V_{STRT}$ can be disabled via the switch $S_1$ to substantially mitigate quiescent power loss, similar to as described previously. For example, the signal FLT_ACC can provide the data associated with the overvoltage condition to any of a variety of central non-volatile memory systems associated with the computer system in which the power supply system 10 is included, such that the data associated with the overvoltage condition can be accessed and analyzed via the central memory even after the startup voltage $V_{STRT}$ is disabled to conserve power.

In addition to operating during the ramp-up phase of initialization of the power supply system 10, the fault controller 24 can likewise be configured to detect and substantially mitigate the effects of an overvoltage condition during normal operation of the power supply system 10. For example, during normal operation of the power supply system 10, the high- and low-side switches of the power supplies 16 are activated and deactivated via the signals PWM_1 through PWM_N via the respective gate driver 52 to generate the respective output voltages $V_{OUT\_1}$ through $V_{OUT\_N}$ based on the DC main voltage $V_{MAIN}$.

During such normal operation of the power supply system 10, a short circuit can develop across the high-side switch of one of the power supplies 16, such that the respective output voltage $V_{OUT\_X}$ begins to increase based on a direct coupling to the DC main voltage $V_{MAIN}$ via the output inductor $L_{OUT}$. Therefore, similar to as described herein, the fault controller 24 can detect the overvoltage condition via the feedback voltage $V_{FB\_X}$ (e.g., based on a comparison with a reference corresponding to an acceptable range of magnitudes), and can cause the DC main voltage $V_{MAIN}$ to be disabled via deactivation of the enable signal EN. In addition, during normal operation of the power supply system 10, the respective gate drivers 52 have sufficient power to control the high- and low-side switches of the power supplies 16. Therefore, the fault controller 24 can be further configured to latch activation of the low-side switch (e.g., the low-side switch $N_2$) of the respective faulted power supply 16 to discharge energy from the output inductor $L_{OUT}$ more rapidly. As a result, the respective output voltage $V_{OUT\_X}$ can decrease more rapidly to further mitigate damage to the respective load $R_{L\_X}$. The fault controller 24 can also write the pertinent data regarding the overvoltage condition to the memory 26, as described previously.

Therefore, as described herein, the power supply system 10 can provide overvoltage protection for the power supplies 16 in an effective and efficient manner, and in a manner that allows for troubleshooting of the cause of the overvoltage condition subsequent to the respective fault. For example, because the fault controller 24 and system controls 22 are powered based on the auxiliary power $V_{AUX}$ (and thus the startup voltage $V_{STRT}$), the fault controller 24 can detect and react to the overvoltage condition during the ramp-up phase of initialization of the power supply system 10 before normal operation of the power supply system 10. Therefore, an overvoltage condition can be detected and corrected before the overvoltage condition has a chance to damage the respective loads $R_{L\_1}$ through $R_{L\_N}$, and also does not rely on activation and/or deactivation of the high- and/or low-side switches as in typical overvoltage protection systems. In addition, such systems that may, for example, deactivate a high-side switch to alleviate an overvoltage may not be effective for mitigating overvoltage conditions that result from a short-circuit across the high-side switch. Also, the fault controller 24 described herein can be implemented internal to the power supply controller 18, and thus conserves space, cost, and power relative to typical systems that implement external circuitry and/or zener diodes. As an example, typical overvoltage protection schemes that rely on zener diodes often require careful selection of proper specification of the zener diode, and can often result in catastrophic failure of the zener diode, and thus the respective power supply system. Furthermore, because the fault controller 24 and associated memory 26 can remain powered after removing the DC main voltage $V_{MAIN}$, the cause of the overvoltage condition can be troubleshooted, as opposed to systems that remove all power to respective power supply controllers which can result in telemetry information being lost.

Figure 4:
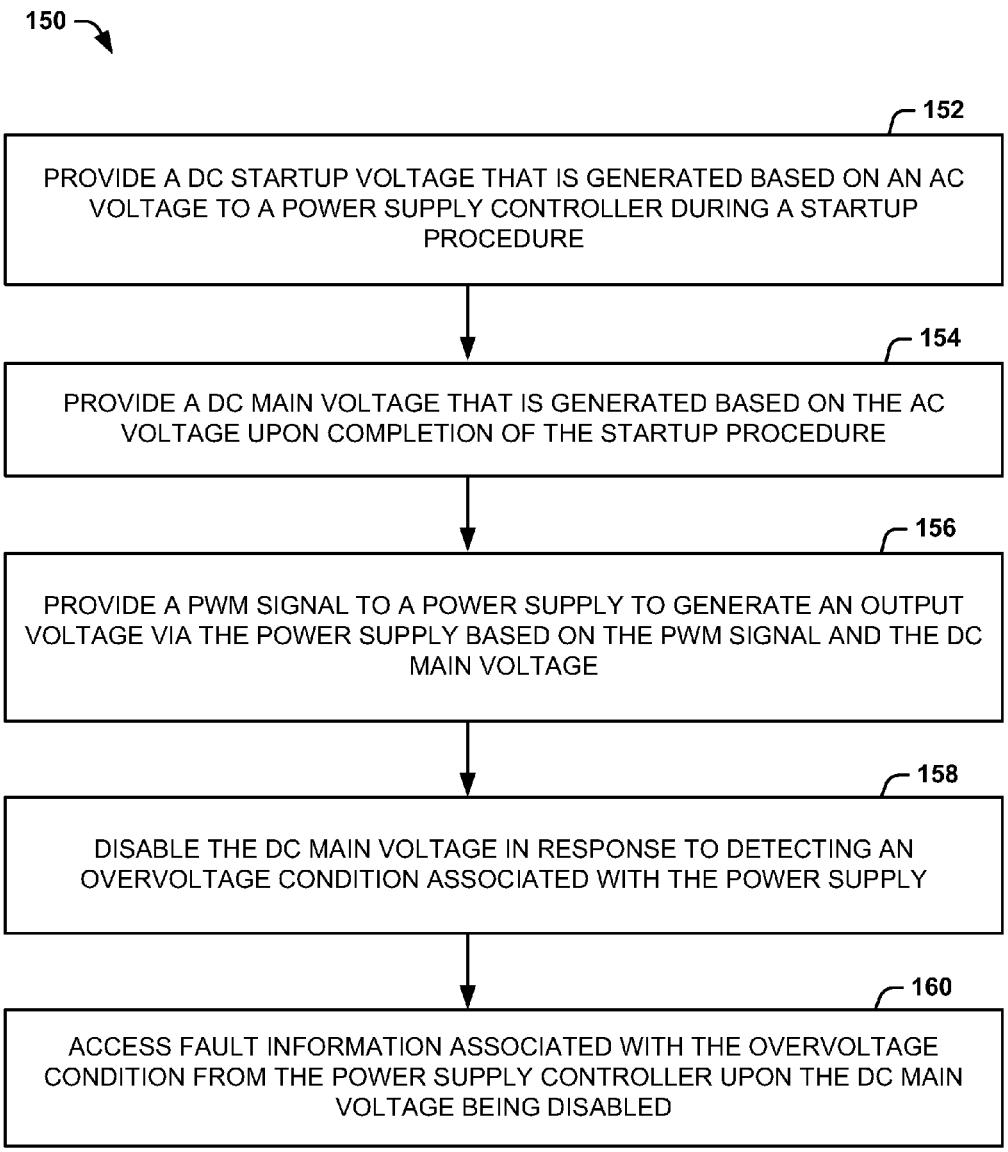
FIG. 4 illustrates an example method for substantially mitigating and troubleshooting an overvoltage condition in a power supply system.

In view of the foregoing structural and functional features described above, an example method will be better appreciated with reference to FIG. 4. While, for purposes of simplicity of explanation, the method of FIG. 4 is shown and described as executing serially, it is to be understood and appreciated that the method is not limited by the illustrated order, as parts of the method could occur in different orders and/or concurrently from that shown and described herein.

FIG. 4 illustrates an example method 150 for substantially mitigating and troubleshooting an overvoltage condition in a power supply system. At 152, a DC startup voltage (e.g., the startup voltage $V_{STRT}$) that is generated based on an AC voltage (e.g., the voltage $V_{AC}$) is provided to a power supply controller (e.g., the power supply controller 18) during a startup procedure. At 154, a DC main voltage (e.g., the DC main voltage $V_{MAIN}$) that is generated based on the AC voltage is provided upon completion of the startup procedure. At 156, a pulse-width modulation (PWM) signal (e.g., the signals PWM_1 through PWM_N) is provided to a power supply (e.g., the power supplies 16) to generate an output voltage (e.g., the output voltages $V_{OUT\_1}$ through $V_{OUT\_N}$) via the power supply based on the PWM signal and the DC main voltage. At 158, the DC main voltage is disabled in response to detecting an overvoltage condition associated with the power supply (e.g., via the fault controller 24). At 160, fault information associated with the overvoltage condition is accessed from the power supply controller (e.g., via the memory 26) upon the DC main voltage being disabled.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A power supply system comprising:
   a power supply to generate an output voltage based on a pulse-width modulation (PWM) signal and a DC main voltage;
   an AC/DC converter to generate the DC main voltage based on an AC input voltage;
   a power supply controller to generate the PWM signal based on feedback associated with the output voltage, the power supply controller comprising a fault controller to detect an overvoltage condition associated with the power supply and to cause the AC/DC converter to disable the DC main voltage in response to the overvoltage condition.

2. The system of claim 1, wherein the power supply controller is to detect the overvoltage condition based on a feedback voltage associated with the output voltage.

3. The system of claim 1, wherein the AC/DC is further to generate a DC auxiliary voltage based on the AC input voltage and to continuously maintain the auxiliary voltage after disabling the DC main voltage.

4. The system of claim 3, further comprising a DC/DC converter to generate a startup voltage based on the auxiliary voltage, the startup voltage being provided to the power supply controller to provide power to the fault controller.

5. The system of claim 4, wherein the power supply controller is to initiate a startup procedure based on the startup voltage and to provide an enable signal to the AC/DC converter to command the AC/DC converter to provide the DC main voltage to the power supply upon completion of the startup procedure.

6. The system of claim 5, wherein the power supply controller is to deactivate the enable signal to disable the DC main voltage in response to the overvoltage condition.

7. The system of claim 4, wherein the DC/DC converter comprises a slew rate controller to control a rate of increase of the startup voltage to substantially mitigate inrush current to the fault controller.

8. The system of claim 1, wherein the fault controller comprises a memory to store fault information associated with the overvoltage condition, the memory being accessible after the DC main voltage has been disabled.

9. The system of claim 1, wherein the power supply comprises a high-side switch and a low-side switch coupled via a switching node and an inductor that interconnects the switching node and an output, the power supply controller being further to latch activation of the low-side switch in response to detecting the overvoltage condition during normal operation of the power supply system.

10. A method for substantially mitigating and troubleshooting an overvoltage condition in a power supply system, the method comprising:
    providing a DC startup voltage that is generated based on an AC voltage to a power supply controller during a startup procedure;
    providing a DC main voltage that is generated based on the AC voltage upon completion of the startup procedure;
    providing a pulse-width modulation (PWM) signal to a power supply to generate an output voltage via the power supply based on the PWM signal and the DC main voltage;
    disabling the DC main voltage in response to detecting an overvoltage condition associated with the power supply; and
    accessing fault information associated with the overvoltage condition from the power supply controller upon the DC main voltage being disabled.

11. The method of claim 10, further comprising:
    generating the output voltage via the PWM signal and a feedback voltage associated with the output voltage; and
    detecting the overvoltage condition via the power supply controller based on the feedback voltage.

12. The method of claim 10, further comprising:
    providing the DC startup voltage to a fault controller associated with the power supply controller; and
    maintaining the DC startup voltage after disabling the DC main voltage.

13. A power supply system comprising:
    a power supply to generate an output voltage in response to a pulse-width modulation (PWM) signal and a DC main voltage;
    an AC/DC converter to generate the DC main voltage based on an AC input voltage in response to an enable signal and to generate a DC auxiliary voltage based on the AC input voltage;
    a DC/DC converter to generate a startup voltage based on the DC auxiliary voltage;
    a power supply controller to generate the enable signal and to generate the PWM signal based on a feedback voltage associated with the output voltage, the power supply controller comprising a fault controller that is powered by the startup voltage and is to detect an overvoltage condition associated with the power supply and to deactivate the enable signal to disable the DC main voltage in response to the overvoltage condition, the fault controller comprising a memory to store fault information associated with the overvoltage condition, the memory being accessible after the DC main voltage has been disabled.

14. The system of claim 13, wherein the power supply controller is to detect the overvoltage condition based on the feedback voltage.

15. The system of claim 13, wherein the power supply comprises a high-side switch and a low-side switch coupled via a switching node and an inductor that interconnects the switching node and an output, the power supply controller being further to latch activation of the low-side switch in response to detecting the overvoltage condition during normal operation of the power supply system.

\* \* \* \* \*